United States Patent [19]
Zammit

[11] Patent Number: 5,210,667
[45] Date of Patent: May 11, 1993

[54] MAGNETIC RECORDING HEADS EMPLOYING MULTIPLE LAPPING GUIDES

[75] Inventor: Robert P. Zammit, Tucson, Ariz.

[73] Assignee: International Business Machines Corporation, Armonk, N.Y.

[21] Appl. No.: 745,165

[22] Filed: Aug. 15, 1991

Related U.S. Application Data

[62] Division of Ser. No. 656,666, Feb. 19, 1991.

[51] Int. Cl.⁵ .................. G11B 5/39; G11B 5/187; G11B 5/29
[52] U.S. Cl. .................... 360/113; 360/121; 360/122
[58] Field of Search .............. 360/113, 121, 122; 29/603

[56] References Cited

U.S. PATENT DOCUMENTS

| | | | |
|---|---|---|---|
| 4,458,279 | 7/1984 | Katz | 360/121 |
| 4,511,942 | 4/1985 | Valstyn | 360/122 |
| 4,523,243 | 6/1985 | Billington | 360/113 |
| 4,675,986 | 6/1987 | Yen | 29/603 |
| 4,689,877 | 9/1987 | Church | 29/603 |
| 4,739,562 | 4/1988 | Kracke et al. | 29/603 |
| 4,914,868 | 4/1990 | Church et al. | 29/603 |

Primary Examiner—John H. Wolff
Assistant Examiner—Craig A. Renner
Attorney, Agent, or Firm—M. W. Schecter; J. A. Pershon

[57] ABSTRACT

A thin film magnetic head and a method for making the thin film head by the use of electrical lapping guides includes the use of a resistive lapping guide that has a height dimension and an electrical resistance that optimizes the results of the comparison of the resistive lapping guide to a finished lapping guide. The resistive lapping guide is not lapped during the lapping process. The finished lapping guide is lapped and the resistive comparison between the two determines the stopping of the lapping process. An as-lapped guide which is of the same dimensions as the finished lapping guide after lapping can also be included. An interleaved magnetic head having alternating magneto-resistive read elements and inductive write elements can be precisely lapped by sensing the resistance of the lapping guide elements and using a formula to determine the final resistance of the finished lapping guide to halt the lapping process.

12 Claims, 4 Drawing Sheets

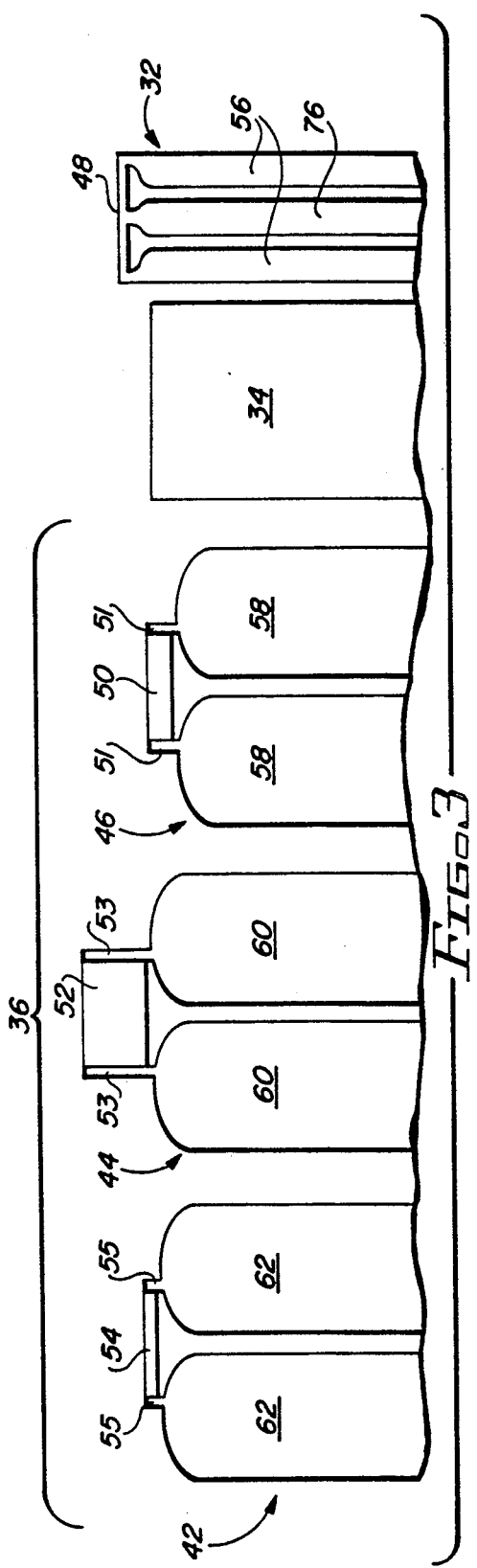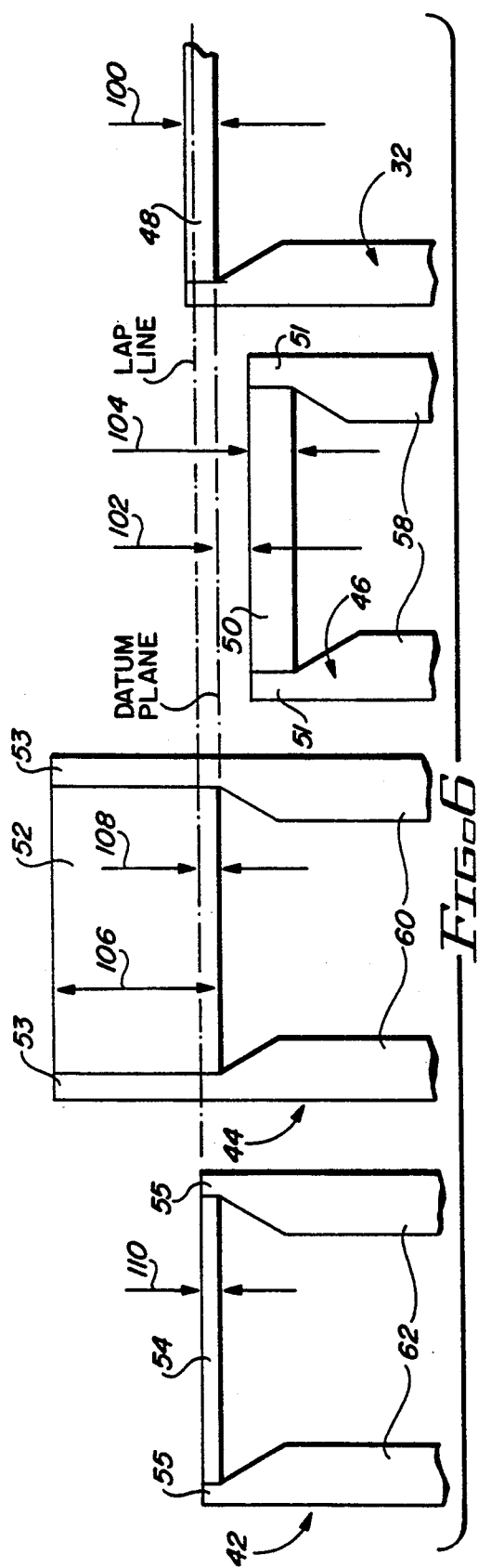

MAGNETIC RECORDING HEADS EMPLOYING MULTIPLE LAPPING GUIDES

This is a divisional of application Ser. No. 07/656,666, filed Feb. 19, 1991, now U.S. Pat. No. 5,065,483.

TECHNICAL FIELD

This invention relates generally to the field of magnetic heads for magnetic recording, and more specifically, to magnetic heads using multiple lapping guides.

BACKGROUND OF THE INVENTION

In high speed data processing systems, magnetic recording has been employed for large memory capacity requirements. Data is read from and written onto the magnetic recordings using magnetic transducers commonly called magnetic heads which are positioned adjacent to the magnetic recording medium. The requirements for higher data density on the medium have imposed a requirement to read and write more data on narrow tracks formed on the media by the magnetic heads. In order to achieve maximum efficiency from the transducers, the magnetic head elements, the transducers are formed from thin films of a magnetic material. The sensing elements must have a pole tip height dimension, commonly called throat height for thin film inductive heads, or element height in the case of a magneto-resistive read element, which must be maintained within a certain limited tolerance for generating a maximum amount of electrical signals from a given head element.

A method of producing a required dimension for the transducer element includes a lapping stage in which an abrasive grinding surface accurately grinds the transducer element to a desired dimension. Suitable techniques for controlling the transducer dimension during the lapping operation are described in U.S. Pat. Nos. 3,821,815, 4,675,986 and 4,689,877, all assigned to the assignee of the present invention. In these patents, a technique is employed for measuring the resistance of an element located on the substrate containing the transducers being lapped to a final dimension. A resistance element is lapped along one dimension to the same extent as the required transducer dimension. The resistance of the element at any given time indicates the amount of material that has been removed from the element and, hence, the resistance is an indication of the final required dimension of the transducer being lapped. Apparatus is also described wherein a plurality of transducers along a row are lapped by controlling the leveling of the row by having lapping control elements at both ends of the row of transducers. Other methods of controlling the lapping of a plurality of transducers includes those wherein electrical lapping guide elements are deposited together with as-lapped guide elements. Reference is made to the IBM Technical Disclosure Bulletin publication at Volume 23, No. 4, September 1980, at Page 1631, and to the article at Volume 18, No. 11, April 1976, at Pages 3782-3. In these publications, a comparison factor for determining the final element height of the transducer using lapping guide elements provides a test element, the as-lapped guide element, that is deposited having the nominal element dimension of a finished transducer. This test element, deposited at the same time that the transducer element is deposited, permits determination of the stripe height of the functional elements with accuracy and without concern for the resistivity, thickness of the films, or the effective path length of the lapping guide element. However, great pains had to be taken using precision optical equipment, for instance, in order to precisely measure the dimensions of this test element. The inaccuracies in the final transducer dimension, especially when it is used alone, are not acceptable for the requirements of the data densities required of the present day transducers.

The present invention, therefore, provides for an improved electrical lapping guide useful, for instance, in one of the systems described above to control the lapping process such that the final element dimension of thin film magnetic heads can be more accurately determined while still using batch processing techniques.

SUMMARY OF THE INVENTION

The present invention produces a magnetic recording head, preferably an interleaved transducing head, that can have its transducing elements lapped to an accurate dimension using a batch processing technique.

The magnetic recording head, according to the present invention, includes a row of transducing elements, separate read and write elements according to the preferred embodiment, with the read elements produced from stripes of a magneto-resistive (MR) material interleaved with alternating write transducers. In the production of a row of the thin film transducers, electrical lapping guides are provided at each end of the row of elements. An electrical lapping guide system can be deposited on both ends of a row of the magnetic transducers, such as read transducer elements or data transducer elements or an array of the devices. In accordance with the present invention, a lapping guide system includes a resistive electrical lapping guide (RLG) and an electrical lapping guide, called the finished lap guide (FLG), that is of a height greater than the eventual height of the read element and is lapped together with the head element. The lapping guide system is deposited on at least one end of the linear array of magnetic head elements during the deposition of the head elements. The resistive lap guide (RLG) is of a resistance and a height which can be used to extrapolate a final resistance required of the finished lap guide. The RLG may or may not be lapped. The electrical resistance and/or height of the RLG is different from the final resistance and/or height of either the head element or the finished lap guide (FLG). The resistance of the RLG is used to preset the equipment used to control the lapping. An as-lapped guide or a test element can also be included. The test elements are photo-etched having the nominal stripe or throat height of the finished transducer element. The same process steps are used to create the datum plane for both the transducer elements and the lapping guides. The height and resistance of the resistive lap guide is optimized to minimize errors in the final finished lap guide height. Errors in processing, that is, thickness and element dimensions, can be accommodated.

An object of the present invention, therefore, is to provide an enhanced lapping guide apparatus useful to the control of the grinding and lapping processes to obtain a precise transducer dimension of a thin film magnetic head.

Another object of the present invention is to provide an electrical lapping guide that is designed to precisely control the manufacturing processes such that the transducer element dimension of a completed magnetic head can be held to a precise length.

A further object of the invention is to provide a magnetic head that includes an electrical lapping guide system on at least one end or on each end of a row of transducer elements that can be used to control the manufacturing process of the magnetic head.

Yet another object of the present invention is to provide a magnetic head and a method of making magnetic heads using electrical lapping guide apparatus that permits the batch process of at least one section of an interleaved magnetic head.

A method of making a thin film head, according to the present invention, comprises the steps of forming at least one thin film magnetic head element on a substrate, forming at least one finished lapping guide on the substrate, preferably one at each side of at least one thin magnetic head element, and forming resistive lapping guides on the substrate, one adjacent to each of the finished lapping guides. The resistance of each resistive lapping guide RLG is sensed and the information is directed to its associated controller for the lapping process. The substrate, including the finished lapping guides and the thin film magnetic head element, is then lapped. The lapping is stopped when the resistance of the finished lapping guide equals the formula of the formed height of the resistive lapping guide, divided by the final required height of the transducer, times the formed resistance of the resistive lapping guide, minus a quantity of the initial formed height of the resistive lapping guide, times the initial formed resistance of the resistive lapping guide, minus the initial height of the finished lapping guide, times the initial resistance of the finished lapping guide with the difference then divided by the difference between the formed height of the resistive lapping guide and the initial formed height of the finished lapping guide and that quantity added to the product.

An interleaved magnetic head can include a plurality of alternating read and write elements located in a row that is eventually mounted transverse to the direction of motion of the magnetic media. At both ends of the row of read and write transducers, lapping guide systems are deposited. The lapping guide systems include a finished lap guide and a resistive lap guide and may also include an as-lapped guide. The finished lap guide is of a height greater than the eventual height of the read element and is lapped together with the transducer element that is required to be of a certain dimension. The finished lap guide initial height is established by the amount of lapping and polishing required to obtain a designated head contour. The resistive lap guide may or may not be lapped and is of a resistance and/or height that is different from the finished resistance and/or height of the transducer element that is to be lapped to the certain dimension. The resistive lapping guide is of a height and resistance that is optimized to minimize errors in the final finished lap guide height. The as-lapped guide is of resistance and/or dimension equal to that of the final finished lapping guide at which the required transducer element is obtained.

Still another object of the present invention, therefore, is to provide an interleaved magnetic head having alternating read and write transducer elements formed in a row that includes electrical lapping guide elements deposited on both ends of the row of transducing elements.

These and other objects of the present invention will become apparent to those skilled in the art as the description proceeds.

BRIEF DESCRIPTION OF THE DRAWINGS

The various novel features of this invention, along with the foregoing and other objects, as well as the invention itself both as to its organization and method of operation, may be more fully understood from the following description of illustrated embodiments when read in conjunction with the accompanying drawings, wherein:

FIG. 5 is a sectional view of FIG. 4 taken along lines 5—5;

FIG. 6 is an enlarged view of the end of the magnetic transducer showing the relative dimensions and positions of the lapping guide system and the transducer element.

DETAILED DESCRIPTION OF THE EMBODIMENTS

The present invention is preferable for use in an interleaved magnetic head. The interleaved magnetic head has its use to read and write magnetic transitions from a multi-track media. This in turn finds its major usage in tape drive systems. A typical tape drive system well known today is the IBM 3490 tape drive. In a tape drive system, the transducer generally remains fixed and the tape is moved across the transducer in both directions to read and write from various transducers in the magnetic head to record data information onto at least one of a plurality of tracks on the media. The interleaved head is of particular importance since the number of tracks can be increased while still providing the bi-directional operation of the media and also permitting an immediate readback check of the data just written onto the tape media. Reference is made to the U.S. Pat. No. 4,125,881 to Eige, et al. and assigned to the assignee of the present invention for a more complete description of a reel-to-reel tape drive and its control which is useful together with the interleaved magnetic head of the present invention. An example of a tape drive for threading the tape media through a complex tape path is disclosed in U.S. Pat. No. 4,335,858 to Cranna, also assigned to the assignee of the present invention. The disclosure in both of these patents is incorporated herein by reference for a more detailed description of the preferred embodiment.

The magnetic head to be used in the practice of the present invention can take the form of any of a number of well known thin film construction types and arrangements. By the use of photo-lithography, it is possible to maximize use of the surface of the magnetic media, since narrow, closely placed tracks can be written.

In the preferred embodiment of a thin film magnetic recording system, an interleaved magnetic head 10 is preferable. The read elements are marked R for the magnetic head 10, while the write elements are marked W. The read and write gaps are used in immediately alternating, odd/even fashion. The term alternating is intended to include other formats. For example, it is the preferred embodiment of the present invention to provide a format of 36 tracks across the width of the media, hereinafter called tape media. One format provides that the odd number tracks, tracks 1, 3, 5, and so-forth, are operating during forward tape movement, while the even numbered tracks 2, 4, 6, and so-forth, are operative during the opposite direction of the movement of the tape media.

Figure 1:
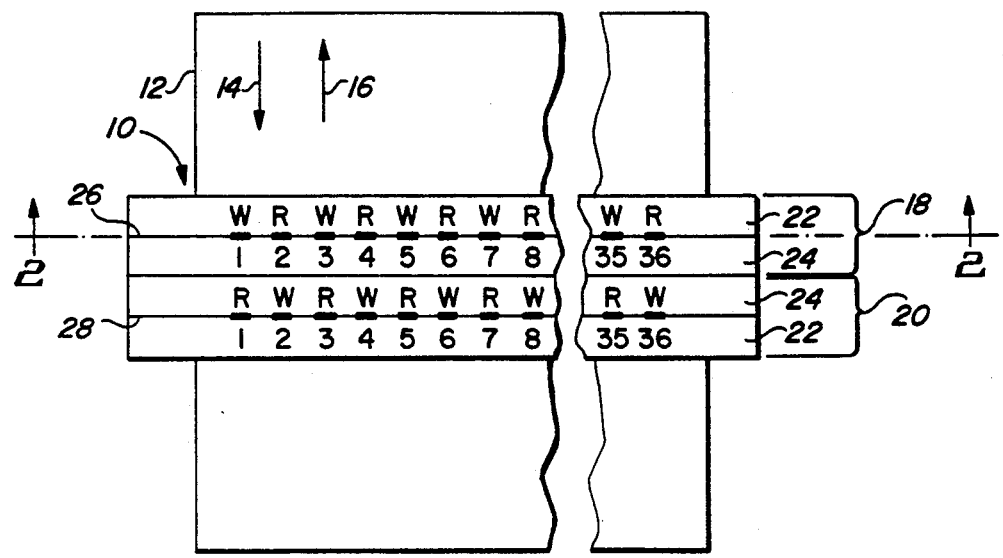
FIG. 1 is a sectional view of a portion of an interleaved head using the elements of the present invention.

In general, referring to FIG. 1, the length of a magnetic tape 12 moves in both a forward and reverse direction as indicated by arrows 14 and 16. The arrow 14 designates the forward movement direction of the tape 12 and the arrow 16 designates the reverse direction. The magnetic tape 12 operates in transducing relationship with the magnetic head 10 in the standard well known format. The magnetic head 10 includes two modules 18 and 20 of generally identical construction. These two modules are mounted together to form a single physical unit. In this manner, the transducing gaps of one module are not only closely spaced to the transducing gaps of the other unit, but also, the module gaps are accurately aligned in the direction of tape movement. There are 18 read transducers and 18 write transducers in each of the modules 18 and 20. Magnetic tape 12, therefore, has 36 tracks across its one half inch width. The tracks are written about 35 percent wider that the read gaps are able to read. Each of the modules 18 and 20 include a magnetic ferrite substrate 22 and a magnetic ferrite closure piece 24. Each module includes one gap line 26 and 28 of modules 18 and 20, respectively, to form the single physical unit of the magnetic head 10. The magnetic head 10 is preferably an interleaved magnetic head such as is disclosed in the U.S. Pat. No. 4,685,005 to Fields and assigned to the assignee of the present invention. The disclosure in this patent is incorporated herein by reference for a more detailed description of the preferred embodiment.

Figure 2:
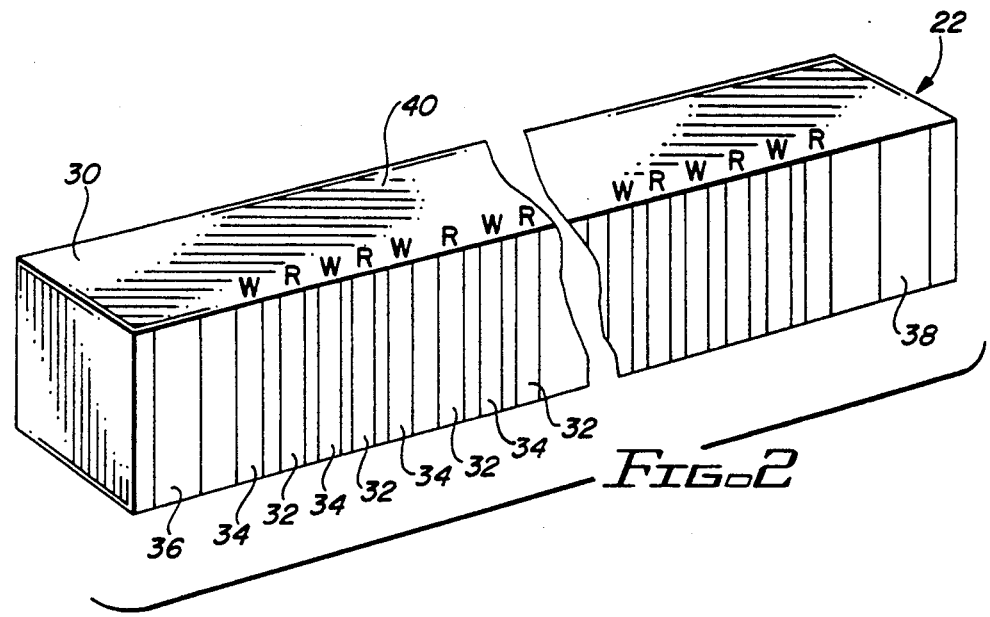
FIG. 2 is a diagrammatic perspective view of a section of the interleaved magnetic head shown in FIG. 1 and taken along lines 2—2.

FIG. 2 shows a cross sectional view of the module 18 together with the placement of the alternating read and write elements and the lapping guide placement according to the present invention. The same reference numerals are used in the drawing to indicate like structural features and operation in the various figures.

Referring to FIG. 2, the module 18 includes a substrate 30, which may, for example, be a nickel zinc ferrite magnetic material upon which are formed a plurality of individual read elements 32 and write elements 34. These read and write elements are formed by successively depositing a number of films on the substrate 30 using photo-lithographic techniques. Lapping guide systems 36 and 38 are also deposited onto the substrate 30 at each end of the head module 18. The precise determination of the dimension of the read elements 32 are determined by the lapping guide systems 36 and 38. The lapping of the module 18 is provided on a top surface 40 which is the surface that will interface with the magnetic tape media 12 (shown in FIG. 1). An enlarged view of the end of the module 18, containing the lapping guide system 36, is shown in FIG. 3.

Figure 3:
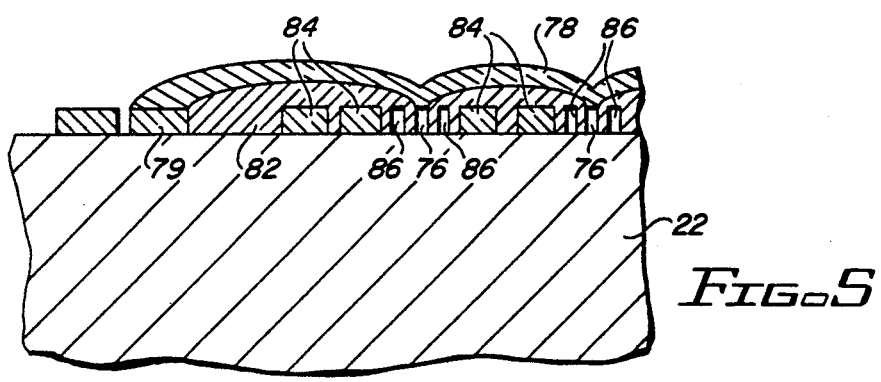
FIG. 3 is a sectional view of the lapping guides of an end portion of the section of an interleaved head as shown in FIG. 2.

As shown in FIG. 3, the end section of the module 18 includes the read element 32, the write element 34, and the lapping guide 36. The lapping guide 36 includes an as-lapped guide (ALG) 42, a finish lap guide (FLG) 44 and a resistive lap guide (RLG) 46. The write block 34 symbolizes a thin film write coil which operates to activate the blocks of magnetic ferrite material located adjacent to each of the write coils. The read element 32 and the write element 34 operate as disclosed in the aforementioned U.S. Pat. No. 4,685,005 and will not be further discussed herein except in interaction to the lapping guide 36. The interaction of the read element 32 as lapped with reference to the lapping guide 36 will be discussed later with the discussion of the later figure.

Still referring to FIG. 3, the read element 32 is a magneto-resistive (MR) element. To form the MR read element 32, first an insulation layer of silicon dioxide and/or alumina is deposited over the entire substrate layer. The insulation layer can be a combination of silicon dioxide and alumina deposited to a total thickness of approximately 6000 Angstroms. In the next step, the layers on an MR element 48 are deposited. All of the MR read elements are deposited at the same time covering the entire magnetic ferrite substrate 22 for the module 18. At the same time, a layer of the same material used for the MR element 48 is deposited in resistive lapping element 50 of the resistive lapping guide 46, on a finished lapping element 52 of the finished lapping guide 44, and on an as-lapped element 54 of the as-lapped guide 42. For the preferred embodiment of the magneto-resistive element 48, a NiFeRh layer of approximately 360 Angstroms is deposited followed by a 200 Angstrom layer of Ta and a 540 Angstrom thickness layer of NiFe. These materials are deposited to form the MR element 48, as well as the resistive lapping element 50, the finished lapping element 52, and the as-lapped element 54. The trilayer for the MR element includes the NiFe magneto-resistive layer itself together with the Ta isolation layer and the NiFeRh soft film bias layer. The operation of such an MR element is well known in the art and will not be further described herein. At the same time that the layers of the MR elements are deposited onto the substrate 22, the same layers are deposited onto the resistive lapping element 50, the finished lapping element 52, and the as-lapped element 54. An adhesion layer, preferably of titanium of approximately 100 Angstroms, is then deposited onto the substrate followed by conductor layers 56 and center conductor 76 for the read element 32, conductor layers for the write element 34 (not shown), conductor layers 58 for the resistive lapping element 46, conductor layers 60 for the finish lapping guide 44, and conductor layer 62 for the as-lapped guide 42. A thin 1000 Angstrom layer of a gold material, that is deposited on the substrate before the actual conductor layers are deposited, is also deposited on the top of the MR material that form the resistive lapping element 50, the finish lapping element 52, and the as lapped element 54. Reference is made to a copending patent application, Ser. No. 07/634,679, filed on Dec. 26, 1990, now U.S. Pat. No. 5,161,299, issued Nov. 10, 1992, for a more complete description of the processes used to make a head of this design. A narrow band of the thin conductor layer is also deposited onto the lapping guide elements. Thus, a narrow band 51 of conductor material is deposited onto the resistive lapping element 50. A narrow band 53 of conductor material is deposited onto the finished lapping element 52. A narrow band 55 of conductor material is deposited onto the as-lapped guide element 54. These narrow bands 51, 53 and 55 operate to lower overall resistance of the lapping guides and also provide constant current density across the respective elements 50, 52, and 54. A more complete description of the build up of the lapping guide 36, and the read elements 32, and the write elements 34, are shown in FIG. 4.

Figure 4:
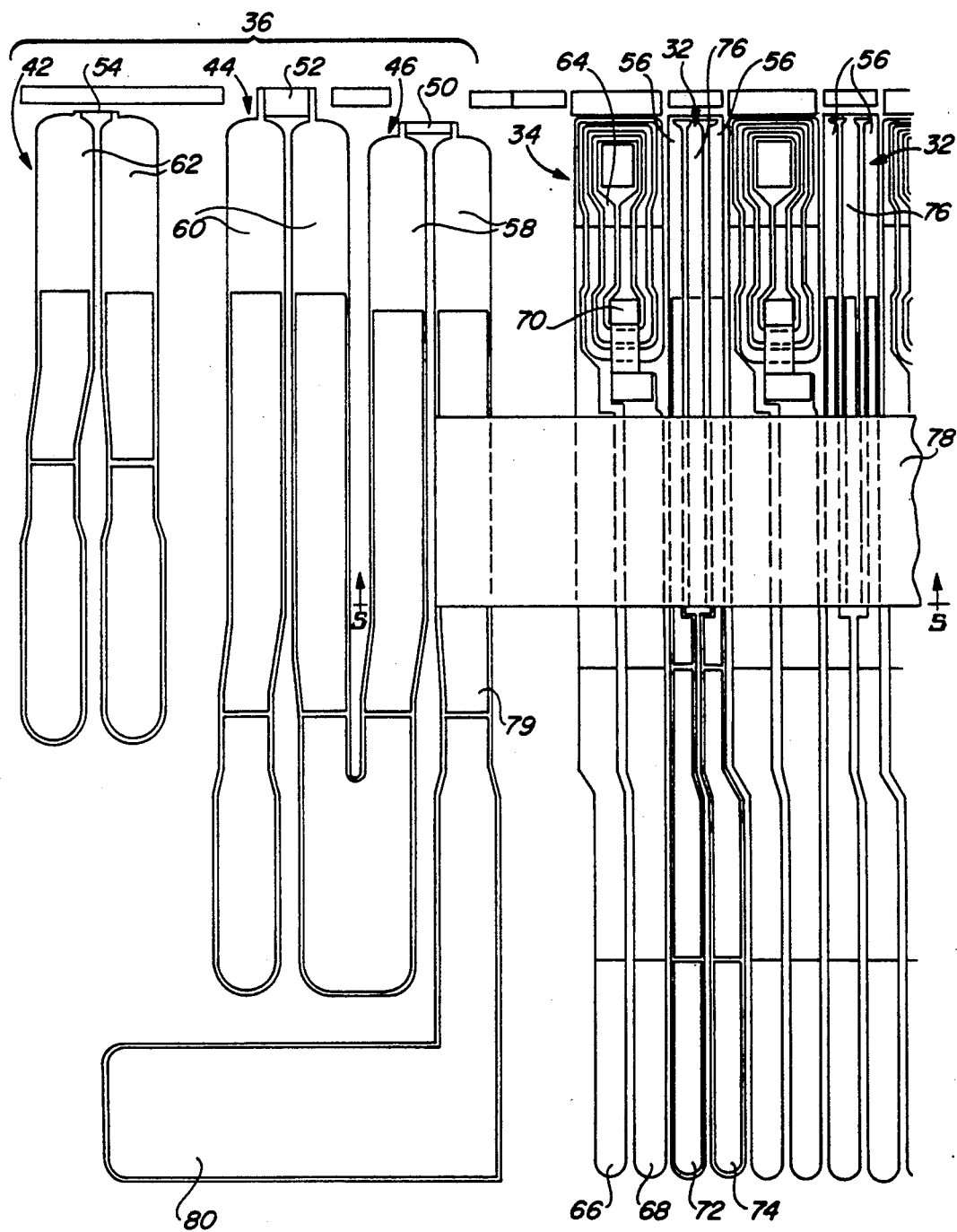
FIG. 4 is an expanded sectional view of FIG. 3 showing the interconnecting conductors of the magnetic head.

In FIG. 4, interconnections with pads for connection to the external testing equipment are shown. Further, the write element 34 includes write conductors 64 interconnected to pads 66 and 68. The write conductors 64 includes a crossover section 70 which connects the cable to the interconnecting conductor pad 68. The read element 32 has its two outer conductor leads 56 connected to external pads 72 and 74. The center tap conductor 76, from each of the read elements 32, is connected to a bus bar 78. The bus bar 78 interconnects all of the center conductors of each of the read elements 32 for connection to a conductor 79 of the resistive lapping guide 46. The conductor lead 79 of the resistive lapping guide 46 has as a dual purpose to interconnect the center conductors of the MR element of the read elements 32 to the outside circuity of the read data system and also as one lead of the resistive lapping guide 46. Both of these interconnect to the external world through conductor pad 80. The interconnection of the jumper pad 78 to all of the center conductors of the MR read elements is shown in FIG. 5.

Referring to FIG. 5, the jumper connector 78 is shown connected to the center conductor 76 of each of the read elements. An insulation layer 82 covers all of a plurality of write conductors 84 and a plurality of the outer read conductor legs 86. The jumper connector 78, therefore, interconnects all of the center conductors of the MR read elements 32 and use the conductor leg 79 of the resistive lapping guide for interconnection to the outside world. The lapping guides 36 are not used during the actual operation of the magnetic head and, therefore, this leg is available for use. The dimensional numbers and the interaction of the different lapping guides 36 to the read element 32 are shown in FIG. 6.

Referring now to FIG. 6, the widths of the as-lapped element 54, the finished lapping element 52, the resistive lapping element 50, and the MR element 48 all are of approximately the same width. The widths of the lapping guides and the read elements are approximately 225 micrometers physical and 190 micrometers effective and do not enter into the calculation. The RLG 46 and the FLG 44 have the identical geometry and film thickness except for the height of their sensing elements 50 and 52, respectively. The RLG narrow band 51 effectively extends the RLG conductors 58 to the top of the RLG sensing element 50. Likewise, the FLG narrow band 53 effectively extends the FLG conductors 60 to the top of the FLG sensing element 52. The physical dimension given above includes the narrow band while the effective width is the width of the sensing elements between the narrow bands. The width of the read element is a function of the track width which is a function of the tape width and the number of tracks required in that tape width. A finished stripe height 100 of the read element 32 is preferably 9 micrometers. The deposited height of the read element 32 could be any height more than the required finished height. A lap line shown in FIG. 6 is the line to which all of the elements are lapped for the final height of the read element 32. The height dimension 100 is the height of the MR read element 48 after lapping and, thus, is taken from the lap line to the bottom of the MR element 48. For the preferred embodiment, the height dimension 100 is approximately 9 micrometers. The resistive lapping element 46 has its resistive lapping element 50 of a distance dimension 102 beneath the datum plane, which for the preferred embodiment is approximately 20 micrometers. It should be noted that for the preferred embodiment, the RLG 46 is not lapped during the lapping process. The RLG sensing element 50 is below the datum plane which is an imaginary line which aligns the deposited element. Lapping does not reach the datum plane because to do so would completely remove the read element 48 of the read transducer 32. A height dimension 104 of the resistive lapping element 50 for the preferred embodiment is approximately 40 micrometers. An initial height dimension 106 for the finished lapping element 52 for the preferred embodiment is approximately 110 micrometers. A finished lapping element dimension 108 at the completion of the lapping will be approximately the same size as the read element which for the preferred embodiment is 9 micrometers. A height dimension 110 of the as-lapped element 54 of the as-lapped guide 42 is approximately the 9 micrometers of the finished read element after the lapping so, therefore, the height of the as-lapped element 54 is the same as the height of the MR element 48 after lapping. After lapping, the resistance of the as-lapped element 54 and the finished lapping element 52 are the same. Apparatus useful for controlling the lapping of the module 18 is shown in FIG. 7.

Figure 7:
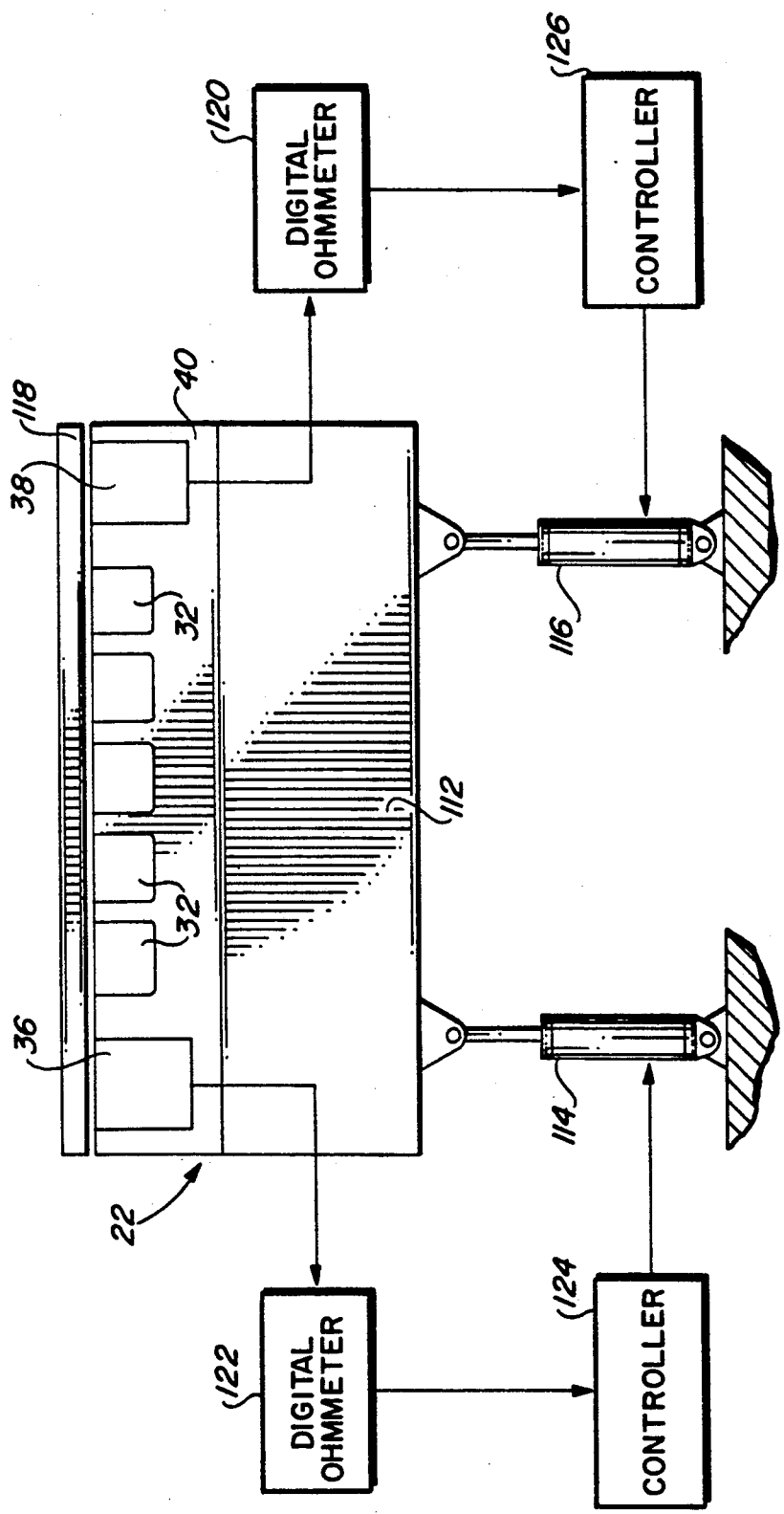
FIG. 7 is a block diagram of apparatus for lapping a substrate having a row of transducing elements with lapping guides as shown in FIG. 3 at each end of the substrate.

Referring to FIG. 7, there is shown an overall system block diagram of apparatus that can be used to control the lapping of one module 18 having a plurality of read and write elements. Only the read elements 32 are shown in FIG. 7 since only the read elements are lapped under control of the lapping guide system 36 and 38 located at both ends of the substrate 22. For example, lapping guide system 38 is located at end 40 of substrate 22. The module 18 is fastened to a holder 112 and placed against two actuators 114 and 116 which position the substrate 22 into a spaced relationship with a lapping plate 118. The actuators 114 and 116 urge the substrate 22 against the lapping plate 118 and control the amount of pressure placed against the holder 112. The lapping plate 118 includes, as is known to those skilled in the art, an abrasive surface which through relative motion effects lapping of the substrate row 22. The substrate row 22 is lapped in order to remove material such that the height dimensions of the read elements 32 and the lapping guides 36 and 38 can be precisely determined.

The depth of the lapping provided by the lapping plate 118 is monitored through the two lapping guide systems 36 and 38. As stated previously, the lapping guide systems 36 and 38 are deposited on the substrate 22 at the same time as the various layers of the MR read transducers 32. Therefore, the lapping guide systems 36 and 38 provide a means of electrically determining the height of the MR elements of the read heads 32. The lapping guide system 36 is connected to a digital ohmmeter 122 which senses the resistance of the FLG 44 element and then directs this information to a controller 124. The controller 124, in turn, controls the actuator 114 such that the left side of the substrate 22 is pressed against the lapping plate 118. The lapping guide system 38 is connected to a digital ohmmeter 120 which senses the resistance of the FLG element in the lapping guide system 38. The output of the digital ohmmeter 120 is connected to a controller 126. The controller 126, in turn, controls the actuator 116 such that the right side of the substrate 22 is pressed against the lapping plate 118. The lapping of the substrate 22 can be kept level by varying the amount of pressure applied by each actuator at its end of the substrate row. The amount of pressure each end of the substrate row receives is controlled and thus permit the actuators 114 and 116 to maintain the substrate 22 level with the lapping surface. Thus, by comparing the relative resistance measurements of the FLG 44 elements of the lapping guides 36 and 38, to the resistance measurements of the RLG 46 elements of the lapping guides 36 and 38, respectively, the heights of the sections of the lapping guides can be kept approximately equal to keep the datum plane of the substrate 22 level with the lapping plate 118 and thereby provide approximately the same lapping to both ends of the module 18. The lapping procedure can best be described by referring to FIGS. 6 and 7.

If the ALG 42 is used to determine the stripe height 100 of the read transducer 32, by measuring the resistance of the ALG, the target resistance for the FLG at which the height equals the height of the ALG is known. If the pattern height of the ALG before lapping is the height desired for the FLG and the MR element 48 after lapping, and if the ALG 42 and the FLG 44 geometries are otherwise identical, lapping the FLG 44 until its resistance equals that of the ALG 42 will result in the height of the MR element 48 equaling that of the ALG 42. For this to be totally accurate, the height of the ALG 42 must be precisely known. However, the photo-lithographic processes by which the ALG 42 and the FLG 44 are created are subject to process variations which produce variations in the final geometric dimensions of the ALG 42 and the FLG 44. As a result, the height of the ALG 42 may vary thereby building error into the target lapping resistance for the FLG 44. That is, the stripe and height dimension tolerance is only as good as the ALG 42 height tolerance.

By using the RLG 46 and the FLG 44 height information, the RLG 46 and the FLG 44 initial electrical resistance data is used to extrapolate the target FLG 44 resistance and, therefore, the errors are reduced. The height of the RLG resistive lapping element 50 may be optimized to minimize errors in the final FLG element 52 height. The equations used to enable the controllers 124 and 126 to calculate the final resistance Rf of the finished lapping guides 44 of the lapping guide systems 36 and 38, respectively, is the following:

$$Rf = \frac{Hr}{Hf}(Rr - Rl) + Rl$$

where
Hr is the height of the RLG 46 before lapping,
Rr is the resistance of the RLG 46 before lapping,
Hf is the final height of the FLG 44 as required for the read head 32, and Rl is the leg resistance $$Rl = \frac{Hr\,Rr - Hi\,Ri}{Hr - Hi}$$

where
Hi is the initial height of the FLG element 52 before lapping, and
Ri is the initial resistance of the FLG element 52.

By using this formula, the controllers 124 and 126 can determine when the lapping procedure is to stop. The resistance of the RLG 46 of the lapping guide 36 is obtained before lapping and this resistance is supplied to the controller 124. The resistance of the RLG 46 of the lapping guide 38 is obtained before lapping, and this resistance is supplied to the controller 126. When the resistance Rf of the finished lapping element 52 from each of the lapping guides 36 and 38 is equal to that calculated by the respective controllers 124 and 126 according to the formula, the lapping procedure stops and the height of the MR elements 48 of the read transducer 32 are of the precise height necessary for optimum reading of the transitions from the magnetic media.

The process of determining the optimum RLG stripe height which gives the minimum error in the final height of the FLG takes into account several constraints.

First, the initial height of the FLG is established by finding the minimum initial FLG height at which a fully-formed and polished head contour can be machined by a manufacturable grinding and lapping process. For the head described herein, that value is approximately 100 micrometers.

Second, the final height of the FLG is established by the final height requirement of the magneto-resistive (MR) read elements. This is true because the FLG and RLG include the same thin film layers as the read elements. The FLG is defined on the wafer to have colinear reference datums. That is, in order to reduce errors and offsets in final FLG and final read element stripe height, both are made of the same material and patterned with the same reference datum. For this head, the final FLG and read element stripe height are 9 microns.

Third, the resistivity of the MR material is established by the magnetic requirements of the read elements. Therefore, the nominal resistance of the FLG is set by the above requirements, and the nominal resistance of the RLG is also known once the RLG height is known.

Fourth, the tolerance of the initial height of the FLG and RLG in a manufacturable process is plus or minus 2 micrometers.

And, fifth, the lead or leg resistance is of sufficient magnitude to require calculation and subtraction from the overall FLG resistance in order to achieve an accurate stripe height versus resistance relationship.

Given the above constraints, the optimum RLG height is determined by considering first the equation which relates the final FLG resistance to the independent variables. The independent variables are the height and resistance of the RLG, the final desired height of the FLG (9 micron), and the leg resistance. The leg resistance calculation itself depends on the height and resistance of the RLG and the initial height and resistance of the FLG. By taking the partial derivative of the equation used to determine the final FLG resistance with respect to each independent variable, and multiplying this result by the expected tolerance range of the dependant variable, the contribution that each independent variable has on the overall tolerance can be obtained. By summing the errors, the total tolerance of the dependant variable is obtained. Now, with a means of determining the total error to the final FLG height resultant from the calculated final FLG resistance, the RLG height which produces the minimum error can easily be obtained.

Generally, what has been described is a means to calculate the RLG height which produced the smallest final FLG height error, given the constraints of a 110 micron initial FLG height, a 9 micron final FLG height, and the need to calculate leg resistance.

The principals of the present invention have now been made clear in an illustrated embodiment. There will be, immediately obvious to those skilled in the art, many modifications of the structure, arrangement, proportions, the elements, materials and components used in the practice of the invention. For instance, the present invention is preferable for use in determining the required stripe height of MR read elements in magnetic heads for use with tape media. It should be understood that other uses for the magnetic heads are within the present invention. Furthermore, the present invention is preferable for use with an interleaved magnetic head wherein a plurality of read and write elements are located on one substrate. It should be understood that a single magneto-resistive read element could be determined using the present invention as well as a row or a plurality of magneto-resistive elements along the head module. The present invention is for use with any types of transducer elements where the resistance of the elements is the determining factor for the best operation of the transducer. Also, the resistive lap guides RLG 46 of both lapping guides 36 and 38 are shown spaced below the datum plane and thus are never lapped. It should be noted that, since the resistance of the RLG 46 in both lapping guides 36 and 38 are sensed before lapping and entered in their respective controllers, the RLG elements may or may not be lapped, as desired, without departing from the present invention. The RLG 46 can be positioned to be lapped and thereby provide an advantage. The RLG 46 datum plane can be aligned coincident to the FLG 44 and read element 32 datum planes, thus, providing a redundant resistance monitor to the FLG 44. The as-lapped guides 42 of the lapping guide systems 36 and 38 may be included or not, or used or not, in the lapping process, again without departing from the present invention. The appended claims are, therefore, intended to cover and embrace any such modifications.

What is claimed is:

1. A magnetic head comprising:
   a substrate and a closure of magnetic ferrite material, the substrate and the closure having individual pole pieces formed therebetween;
   a plurality of stripes of magneto-resistive elements deposited on said substrate adjacent to the individual pole pieces, said magneto-resistive elements having a stripe height alterable by lapping;
   a plurality of write conductors, alternately placed with said magneto-resistive elements;
   a lapping guide system formed at each end of said substrate encompassing said plurality of magneto-resistive elements and write conductors;
   each lapping guide system having a finish lapping guide and a resistive lapping guide, each lapping guide system capable of specifying the stripe height of the magneto-resistive elements to a specified stripe height during said lapping by measuring a resistance only of the finish lapping guide, said finish lapping guide having a stripe height alterable by said lapping, the stripe height of the finish lapping guide before said lapping being greater than the stripe height of the magneto-resistive elements before said lapping and sufficient to process a contour of the substrate, and the stripe height of the finish lapping guide after said lapping being equal to the specified stripe height of the magneto-resistive elements, said resistive lapping guide having a stripe height greater than the stripe height of the finish lapping guide after said lapping, wherein the specific stripe height is determined by considering the stripe heights of the finish lapping guide and the resistive lapping guide before said lapping.

2. The magnetic head as defined in claim 1, further including a second substrate and closure of magnetic ferrite material, said second substrate having said plurality of magneto-resistive elements and write conductors deposited thereon and said lapping guide systems deposited at each end of said second substrate.

3. In an interleaved magnetic head having a substrate and a closure block of magnetic ferrite material with individual pole pieces formed between the substrate and the closure, and a plurality of alternating magneto-resistive elements, having a stripe height alterable by lapping, and write conductors deposited on the substrate, the improvement comprising:
   a lapping guide system deposited at each end of the substrate encompassing the alternating magneto-resistive elements and write conductors;
   each lapping guide system including a finish lapping guide and a resistive lapping guide, each lapping guide system capable of specifying the stripe height of the magneto-resistive elements to a specified stripe height during said lapping by measuring a resistance only of the finish lapping guide, said finish lapping guide having a strip height alterable by said lapping, the stripe height of the finish lapping guide before said lapping being greater than the stripe height of the magneto-resistive elements before said lapping and sufficient to process a contour of the substrate, and the stripe height of the finish lapping guide after said lapping being equal to the specified stripe height of the magneto-resistive elements, said resistive lapping guide having a stripe height greater than the stripe height of the finish lapping guide after said lapping, wherein the specified stripe height is determined by considering the stripe heights of the finish lapping guide and the resistive lapping guide before said lapping.

4. A magnetic head comprising:
   a substrate of a magnetic ferrite material having individual pole pieces formed thereon;
   a plurality of magneto-resistive elements deposited on said substrate adjacent the individual pole pieces;
   a plurality of write conductors, alternately formed with said magneto-resistive elements; and
   a lapping guide system formed at each end of said substrate encompassing said plurality of magneto-resistive elements and write conductors;
   each of said lapping guide systems having a finish lapping guide and a resistive lapping guide, with a resistance Rf of the finish lapping guide being defined by of a formula:

$$Rf = \frac{Hr}{Hf}(Rr - Rl) + Rl$$

where
Hr is a height dimension of the resistive lapping guide as initially deposited,
Rr is an initial deposited resistance of the resistive lapping guide;
Hf is a final height dimension of the finished lapping guide and $$Rl = \frac{Hr\,Rr - Hi\,Ri}{Hr - Hi}$$

where:
Hi is an initial deposited height of the finished lapping guide,
Ri is an initial deposited electrical resistance of the finish lapping guide.

5. A magnetic head comprising:
a substrate and a closure of magnetic ferrite material, the substrate and the closure having individual pole pieces formed therebetween;
a plurality of stripes of magneto-resistive elements deposited on said substrate adjacent to the individual pole pieces, said magneto-resistive elements having a stripe height alterable by lapping;
a plurality of write conductors, alternately placed with said magneto-resistive elements;
a lapping guide system formed at each end of said substrate encompassing said plurality of magneto-resistive elements and write conductors;
each lapping guide system having a finish lapping guide and a resistive lapping guide, each lapping guide system capable of specifying the stripe height of the magneto-resistive elements to a specified stripe height during said lapping by measuring a resistance only of the finish lapping guide, said finish lapping guide having a stripe height after said lapping equal to the specified stripe height of the magneto-resistive elements, said resistive lapping guide having a stripe height greater than the stripe height of the finish lapping guide after said lapping.

6. The magnetic head as defined in claim 5, further including a second substrate and closure of magnetic ferrite material, said second substrate having said plurality of magneto-resistive elements and write conductors deposited thereon and said lapping guide systems deposited at each end of said second substrate.

7. In an interleaved magnetic head having a substrate and a closure block of magnetic ferrite material with individual pole pieces formed therebetween a plurality of alternating magneto-resistive elements, having a stripe height alterable by lappings and write conductors being deposited on the substrate, the improvement comprising:
a lapping guide system deposited at each end of the substrate encompassing the alternating magneto-resistive elements and write conductors;
each lapping guide system including a finish lapping guide and a resistive lapping guide, each lapping guide system capable of altering the stripe height of the magneto-resistive elements to a specific stripe height during said lapping by measuring a resistance only of the finish lapping guide, said finish lapping guide having a stripe height after said lapping equal to the specified stripe height of the magneto-resistive elements, said resistive lapping guide having a stripe height greater than the stripe height of the finish lapping guide after said lapping.

8. A magnetic head for inclusion into a tape drive wherein the tape drive includes a drive means for transporting tape media past said magnetic head, a motion control for controlling said drive means, and a data control to activate said magnetic head to write data onto the media and to retrieve data from the media as the drive means transports the media;
said magnetic head comprising:
a substrate and a closure of magnetic ferrite material, the substrate and the closure having individual pole pieces formed therebetween;
a plurality of stripes of magneto-resistive elements deposited on said substrate adjacent to the individual pole pieces, said magneto-resistive elements having a stripe height after processing alterable by lapping;
a plurality of write conductors, alternately placed with said magneto-resistive elements;
a lapping guide system formed at each end of said substrate encompassing said plurality of magneto-resistive elements and write conductors;
each lapping guide system having a finish lapping guide and a resistive lapping guide, each lapping guide system capable of specifying the stripe height of the magneto-resistive elements to a specified strip height during said lapping by measuring a resistance only of the finish lapping guide, said finish lapping guide having a stripe height after said lapping equal to the specified stripe height of the magneto-resistive elements, said resistive lapping guide having a stripe height greater than the stripe height of the finish lapping guide after said lapping.

9. The magnetic head as defined in claim 8, further including a second substrate and closure of magnetic ferrite material, said second substrate having plurality of magneto-resistive elements and write conductors deposited thereon and said lapping guide systems deposited at each end of said second substrate.

10. The magnetic head for inclusion into the tape drive as defined in claim 8 wherein the tape media is stored on a reel in a cartridge and the drive means is adapted to remove the media from the cartridge by a mechanism which directs the media to a take-up reel past said magnetic head under control of the motion control, and includes drive motors to rotate the cartridge reel and the take-up reel, with both drive motors being controlled by the motion control.

11. An interleaved magnetic head for inclusion into a tape drive wherein the tape drive includes a drive means for transporting tape media past said magnetic head, a motion control for controlling said drive means, and a data control to activate said magnetic head to write data onto the media and to retrieve data from the media as the drive means transports the media;
said magnetic head comprising:
a substrate of magnetic ferrite material and a closure block of magnetic ferrite material, said substrate having individual pole pieces formed therebetween and having a plurality of alternating magneto-resistive elements, having a stripe height alterable by lapping and write conductor;
a lapping guide system deposited at each end of the substrate encompassing the alternating magneto-resistive elements and write conductors;
each lapping guide system including a finish lapping guide and a resistive lapping guide, each lapping guide system capable of specifying the stripe height of the magneto-resistive elements to a specified stripe height during said lapping by measuring a resistance only of the finish lapping guide, said finish lapping guide having a stripe height after said lapping equal to the specified stripe height of the magneto-resistive elements, said resistive lapping guide having a stripe height greater than the stripe height of the finish lapping guide after said lapping.

12. The magnetic head for inclusion into the tape drive as defined in claim 11 wherein the tape media is stored on a reel in a cartridge and the drive means is adapted to remove the media from the cartridge by a mechanism which directs the media to a take-up reel past said magnetic head under control of the motion control, and includes drive motors to rotate the cartridge reel and the take-up reel, with both drive motors being controlled by the motion control.

* * * * *

UNITED STATES PATENT AND TRADEMARK OFFICE
CERTIFICATE OF CORRECTION

PATENT NO. :    5,210,667
DATED       :    May 11, 1993
INVENTOR(S) :   Robert P. Zammit It is certified that error appears in the above-identified patent and that said Letters Patent is hereby corrected as shown below:

At column 12, line 29, the word "strip" should be --stripe--.

At column 13, line 53, the word "specific" should be --specified--.

At column 14, line 54, the word "conductor;" should be --conductors;--.

Signed and Sealed this

Third Day of May, 1994

Attest:

BRUCE LEHMAN

Attesting Officer

Commissioner of Patents and Trademarks